United States Patent
Sumiya et al.

(10) Patent No.: US 12,211,284 B2
(45) Date of Patent: Jan. 28, 2025

(54) MODULAR SURVEILLANCE SYSTEM FOR AN INFRASTRUCTURE AND/OR A VEHICLE

(71) Applicant: MITSUBISHI HEAVY INDUSTRIES, LTD., Tokyo (JP)

(72) Inventors: Daisuke Sumiya, Erlangen (DE); Ryota Hiura, Erlangen (DE); Johannes Dagner, Erlangen (DE); Sascha Maisel, Erlangen (DE)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 433 days.

(21) Appl. No.: 17/615,707

(22) PCT Filed: Jun. 17, 2020

(86) PCT No.: PCT/IB2020/055630
§ 371 (c)(1),
(2) Date: Dec. 1, 2021

(87) PCT Pub. No.: WO2020/254971
PCT Pub. Date: Dec. 24, 2020

(65) Prior Publication Data
US 2022/0245946 A1    Aug. 4, 2022

(30) Foreign Application Priority Data
Jun. 17, 2019  (EP) .................................. 19180723

(51) Int. Cl.
*G06V 20/52* (2022.01)
*G06V 20/59* (2022.01)

(52) U.S. Cl.
CPC .............. *G06V 20/53* (2022.01); *G06V 20/59* (2022.01)

(58) Field of Classification Search
None
See application file for complete search history.

(56) References Cited

U.S. PATENT DOCUMENTS

| 2007/0024746 A1* | 2/2007 | Cole ........................ H04N 5/04 348/706 |
| 2011/0216200 A1* | 9/2011 | Chung ................... H04N 7/183 348/148 |

(Continued)

FOREIGN PATENT DOCUMENTS

| CN | 102341291 A | 2/2012 |
| CN | 105320122 A | 2/2016 |

(Continued)

OTHER PUBLICATIONS

PCT/ISA/210, "International Search Report for International Application No. PCT/IB2020/055630," Sep. 9, 2020.

(Continued)

*Primary Examiner* — Ricky Chin
(74) *Attorney, Agent, or Firm* — HAUPTMAN HAM, LLP

(57) ABSTRACT

The invention relates to a surveillance system for an infrastructure and/or for a vehicle, including at least two sensor modules configured to collect respective sensor data from respectively associated sensors; at least one access module being configured to access the sensor data; and a clock module being configured to provide a common time signal at least to two of the sensor modules; wherein the sensor modules are configured to provide the sensor data with a time stamp, wherein the time stamp is based on the common time signal; and the access module being configured to forward the accessed sensor data by taking into account the time stamp so as to provide an enhanced surveillance and/or maintenance system which is suitable for large and/or complex infrastructures, vehicles, and combinations thereof.

13 Claims, 4 Drawing Sheets

(56) References Cited

U.S. PATENT DOCUMENTS

| | | | | |
|---|---|---|---|---|
| 2011/0234474 A1* | 9/2011 | Natori | ............... | H04N 9/3197 |
| | | | | 345/1.3 |
| 2013/0162905 A1* | 6/2013 | Matsumoto | ....... | H04N 21/8106 |
| | | | | 348/521 |
| 2015/0021444 A1* | 1/2015 | Goergen | ............ | G06F 3/0683 |
| | | | | 711/148 |
| 2015/0213838 A1* | 7/2015 | Dinev | ............... | G11B 27/031 |
| | | | | 386/224 |
| 2016/0039439 A1* | 2/2016 | Fahmy | ............... | B61L 15/0081 |
| | | | | 701/20 |
| 2017/0323543 A1* | 11/2017 | Glaser | ............... | H04N 1/3232 |
| 2018/0077443 A1* | 3/2018 | Lau | .................. | H04N 21/2625 |
| 2018/0115686 A1* | 4/2018 | Carpenter | ............ | G11B 27/10 |
| 2019/0363815 A1* | 11/2019 | Bogenberger | ............ | G06F 1/12 |
| 2020/0014969 A1* | 1/2020 | Lau | .................. | H04N 21/4305 |
| 2020/0031373 A1* | 1/2020 | Ohki | .................... | B61K 13/04 |
| 2020/0322703 A1* | 10/2020 | Bures | .................. | G06F 16/27 |
| 2020/0358720 A1* | 11/2020 | Ono | ........................ | H04L 45/74 |
| 2021/0076107 A1* | 3/2021 | Quek | .................. | H04N 21/812 |
| 2021/0077904 A1* | 3/2021 | Yen | ...................... | A63F 13/335 |
| 2022/0245946 A1* | 8/2022 | Sumiya | .................. | G06V 20/59 |
| 2022/0262171 A1* | 8/2022 | Sumiya | .................. | G08B 23/00 |

FOREIGN PATENT DOCUMENTS

| | | |
|---|---|---|
| CN | 106100908 A | 11/2016 |
| CN | 109305046 A | 2/2019 |
| EP | 3254928 A1 | 12/2017 |
| EP | 3470937 A1 | 4/2019 |
| JP | 2002-247562 A | 8/2002 |
| WO | 2018/180311 A1 | 10/2018 |

OTHER PUBLICATIONS

PCT/ISA/237, "Written Opinion of the International Searching Authority for International Application No. PCT/IB2020/055630," Sep. 9, 2020.

Arndt, M. "Modular concept of diagnostic and monitoring technologies," Signal+Draht, Jun. 1, 2015, p. 38-45, vol. 107, No. 6.

* cited by examiner

MODULAR SURVEILLANCE SYSTEM FOR AN INFRASTRUCTURE AND/OR A VEHICLE

RELATED APPLICATIONS

The present application is National Phase of International Application No. PCT/IB2020/055630 filed Jun. 17, 2020, and claims priority from European Application No. 19180723.9, filed Jun. 17, 2019, the disclosure of which is hereby incorporated by reference herein in its entirety.

The invention relates to a modular surveillance and/or maintenance system for an infrastructure such as a train station, an airport, a store or another public space and/or for a vehicle such as a train, an aeroplane or a ship. Such a surveillance system comprises at least two sensor modules configured to collect or record respective sensor data from a respective associated sensor such as a camera, microphone, or another sensor providing the sensor data, and at least one access module configured to access the sensor data.

As in modern infrastructures and/or vehicles both size and complexity increase, there is an increasing demand for automated or at least partly automated surveillance and/or maintenance systems.

In this context, JP 2002 247 562 A provides a monitoring camera system coping with a network by which a working rate equivalent to the one of a multiprocessor type computer can be realized. This monitoring camera system is provided with said network for transmitting image data outputted from a plurality of monitoring camera units, shared by a plurality of the monitoring cameras and a server for receiving the image data via the network. A plurality of the monitoring cameras is provided with a communication control part for setting a protocol corresponding to the network to the image data and the server is provided with a protocol control part for receiving the image data to which the protocol is set from the network.

As for vehicle surveillance, WO 2018/180311 A1 provides a technology for monitoring train doors for improving the accuracy of detection of trapping in vehicle doors. Therein, the server compares the difference between a static image, the reference image, from each monitoring camera of a normal state in which there is no trapping in vehicle doors, and a static image, an observation image, acquired in a prescribed acquisition time. If a difference is detected and hence trapping in the door is probable, this can be indicated on a monitor.

It is a problem to be solved by the invention at hand to provide an enhanced surveillance and/or maintenance system, in particular a system suitable for large and/or complex infrastructures, vehicles, and combinations thereof.

This problem is solved by the subject matter of the independent claims. Advantageous embodiments are apparent from the dependent claims, the description, and the drawings.

One aspect relates to a modular surveillance and/or maintenance system for an infrastructure such as a train station, an airport, store, or another public space, for instance, and/or for a vehicle such as train, aeroplane, or a ship, for instance. A surveillance system may also be referred to as a monitoring system.

The system comprises at least two sensor modules, each configured to collect or record respective sensor data from a respective sensor such as a camera, a microphone, or another sensor associated with the sensor module, with the sensor providing the sensor data. Therein, the sensors may also be or comprise sensor units with several sensors. The sensor modules are configured to provide the sensor data to a data network of the system which connects different modules of the system, for instance to an access module and/or a storage module (as specified below). Correspondingly, said sensor modules can be considered as source modules, as they function as a source or the data in the network.

Furthermore, the system comprises at least one access module, i.e. one or more access modules, configured to access the sensor data of one, several, or all sensor modules. Therein, all sensor modules of the system can be accessed by at least one access module. The access module(s) may be configured to access the sensor data via the data network directly in (or from) the respective sensor modules or indirectly, that is, via a storage module where the sensor data of the sensor modules may be stored (which is described below). The access module is configured to forward the accessed sensor data to another module, for instance a storage module and/or an output module and/or another access module, and/or to analysis module (which will be specified below). So, the access module can be considered as a distributing module that forwards the data from designated source modules to one or more designated target modules. Therein, the target modules may be one or several of said storage modules and/or output modules and/or analysis modules and/or other access modules. The source modules may be one or several of said sensor modules and/or service storage modules and/or other access modules and/or a clock module (described in the following). Any access module may also be implemented together with an associated target module as a software and/or hardware unit.

The system also comprises said clock module, which is configured to provide a common time signal to at least two sensor modules of the at least two sensor modules, in particular to all sensor modules of the system. For instance, the system may also comprise three sensor modules where only two of them are provided with the common time signal and are hence capable of providing their respective sensor data with a time stamp, which is described in the next paragraph. Even in the case the system comprises also sensor modules that to not receive the common time signal and thus cannot provide a time stamp to their respective sensor data, the system still maintains the advantages described below. The clock module may provide the common time signal also to the at least one access module and/or at least one storage module and/or the at least one output module and/or to the at least one analysis module. The common time signal may contain time-zone information in order to avoid data synchronization confusion.

The clock module may be realized in one single, integrated hardware unit, but may also be realized by several distinct and/or distributed collaborating clock units. The collaborating clock units may also be cascaded. Preferably, the collaborating clock units are synchronized. For instance, one clock module (or one clock unit of the clock module) may work as a source for an absolute-time signal by network time protocol (NTP) and another clock module (or another clock unit of the clock module) may work as a source for a sequentially numbered heart-beat-time signal by different protocol, where latter clock module (or unit) is synchronized to former clock module (or unit) through NTP.

This gives the advantage of synchronizing the all sensor modules including the ones which are not compliant with NTP protocol or such high-level communication capability by the reason of limited computational resources.

The sensor modules are configured to provide the sensor data to the network with a timestamp, that is, add a timestamp to the sensor data, where the timestamp is based on the common time signal. Correspondingly, the access module is configured to forward the accessed sensor data to the respective other module taking into account the timestamp, that the forwarding relies on the timestamp. So, the access unit uses the timestamp when forwarding or providing the sensor data to another (target) module. For instance, this can be done in form of a sensor data stream comprising the sensor data of different sensor modules in a timely order, in particular with said timestamp as an index, for instance.

So, the different modules are connected to each other by the data network, the sensor modules are configured to provide the collected sensor data to the network, where it is retrieved from by the access unit(s) and/or, as described below in more detail, by one or more storage modules, which thereby access the sensor data. For instance, one access module accesses the sensor data of two sensor modules and forwards it, taking into account the timestamp, to an output module, for instance a monitor. On the monitor, the sensor data may by displayed in parallel and, thanks to the timestamp, perfectly synchronized. This allows a user to supervise said infrastructure and/or vehicle on the monitor better as a more realistic estimate of the state of infrastructure and/or vehicle can be achieved. Correspondingly, in this example, in view of the connection between sensor modules and access module, the sensor modules would be source modules and access module a target module. In view of the connection between the access module and output module, the output module would be the target module and the access module the source module.

This gives the advantage of a flexible, reliable system that can also be used to monitor and, consequently, maintain large or complex infrastructures and/or vehicles, as delays in the network of the surveillance system due to high data load and/or due to different cable lengths from the respective sensors to access/output/analysis module and/or due to a different number of hierarchical levels (and thus processing steps) between the respective sensor module and the access/output/analysis module can be compensated by taking into account the timestamp when forwarding the sensor data by the access module. Therefore, reliable surveillance and maintenance is also possible in a system which includes different hierarchical trees with several intermediate or parallel processing levels: for example one set of sensor modules in a first location such as train station and another set of sensor modules in a second location such as a train, which then can jointly be monitored using a common output module, where individual delays of the different hierarchical trees can be compensated by the system. This allows better assessment of the state the monitored infrastructure and/or vehicle is in, as temporal correlations in events detected by the different sensor modules can be understood more easily and reliably by both a supervising human as well as a supervising algorithm in an analysis module.

In an advantageous embodiment, the access module is configured to forward the sensor data to an output module, in particular an output module with a monitor and/or a loudspeaker, and/or to another access module and/or to an analysis module, which is configured to analyse the sensor data. For instance, the analysis module may be or comprise a computer running analysing routines or algorithms on the sensor data in order to detect correlations and/or abnormalities.

This gives the advantage that the sensor data, and thus the infrastructure and/or the vehicle, can be monitored (manually) by a human and/or (automatically) by a computer, where basically any arbitrary layout of the system can be designed in order to choose the optimal structure for the surveillance system in the individual infrastructure and/or vehicle to be monitored at hand. Here, it has to be pointed out that the use of several access modules, in particular, allows a system design where specific bottlenecks in the network can be avoided, as the data traffic can be distributed more homogeneously throughout the network as compared to a single data node where all the data needs to be transmitted through, for example, on single access module.

In another advantageous embodiment, the access module is configured to forward the sensor data of or from at least two different source modules to the output module and/or a storage module and/or another access module and/or the analysis module in a synchronized way. When forwarding sensor data in a synchronized way, sensor data with the same time step will be forwarded together and/or at the same time, where the same time may refer to the same time window according to a transfer protocol or the like. In particular, the source modules may be or comprise respective sensor modules or storage modules or output modules or mixtures of said modules, as well as a clock module.

This gives the advantage that the sensor data may be also output and/or stored in a synchronized way, or further forwarded in a synchronized way more easily. This makes further processing by a computer or supervising by a human easier. Also, the access module then only forwards (and potentially, in particular when the accessed sensor data is stored in a storage module, also accesses) the sensor data which needs to be forwarded at the specific time, resulting in a more homogeneous workload in the network.

Therein, that is in order to forward the sensor data of the at least two different source modules in a synchronized way, the access module may be configured to evaluate respective (relative and/or absolute) time lags of the sensor data stemming from the different source modules, and delay forwarding sensor data of at least one source module based on the evaluated time lags. In particular, the forwarding of the sensor data of the at least one source module may be based on the maximum time lag evaluated. So the access module may be configured to forward sensor data from different sources with a respective timestamp corresponding to the same point in time, which arrived at the access module at different times, that is, with different (relative) time lags, together and/or synchronized. In addition to or alternatively to said relative time lags, the module(s) evaluating the time lag may evaluate an absolute time lag of the sensor data. This can, for instance, be realized by providing the respective module(s) with the common time signal and comparing the time stamps of the sensor data with the common time signal reflecting global time. In particular, all sensor data that is forwarded by the access module may be forwarded together and/or synchronized. Alternatively, a subset of sensor data may be forwarded in an unsynchronized way, for instance the moment it arrives in the access module. When such "unsynchronized" sensor data is, for instance, output to a human operator, it is preferably marked as unsynchronized.

This gives the advantage that that the data which is prioritized to be observed with less delay than to be synchronized with other data can be shown with minimal delay as required and without confusing the human operator.

In yet another advantageous embodiment, the sensor modules are of at least two qualitatively different types where each type of sensor module is associated with a different type of sensor and is configured to collect a qualitatively different type of sensor data. This gives the advantage of a system that provides an extensive and particularly precise overview of the state of the monitored infrastructure and/or vehicle.

In particular, each of the different types of sensor modules may be associated with at least one of the following sensors as respective sensor: camera sensor, multi-camera sensor, microphone sensor, multi-microphone sensor, temperature sensor, fire alarm sensor, smoke sensor, voltage sensor, power consumption sensor, door sensor, emergency button sensor, escalator load sensor, vehicular sensor, electronic current sensor, flow rate sensor, pressure sensor, rotational speed sensor, translational speed sensor, rotational acceleration sensor, translational acceleration sensor, vibration sensor, motion detection sensor, radar sensor, Hall sensor, ultrasonic sensor, GPS (which may include any global positioning system, GPS, GLONASS, Galileo or alike) sensor, load cell sensor (which may for instance be used as a force gauge), light barrier sensor. So, one sensor module may collect sensor data from a camera sensor, which makes it a camera sensor module, while another sensor module may be associated with voltage sensor as respective sensor, which makes it a voltage sensor module, and so on. Said types of sensors and sensor modules have been proven particularly useful in surveillance and maintenance of infrastructures and/or vehicles, and thus are particularly advantageous.

In another advantageous embodiment the sensor modules and/or access modules and/or storage modules and/or output modules and/or analysis modules have a unified interface (or unified interfaces) and/or are configured to be exchangeable or replaceable, in particular exchangeable or replaceable during the operation of the system ("hot-pluggable"). To this end, the sensor data can be encapsulated data, for instance in a so-called container format, where all sensor data has the same data format in spite of varying type of content. Then, the access module can handle the data without needing information about the content. Also, in order to be exchangeable during the operation of the system, the different modules, for instance the access module of the vehicle and in access module of an infrastructure, may connect themselves via a wireless connection, for instance WLAN or Bluetooth.

This gives the advantage of a particularly flexible system, where sensor modules may be upgraded or exchanged during the operation and/or without the necessity of changing hardware and/or software in the rest of the system. This exchangeability also enables the flexible integration of sensor modules of different entities such as an infrastructure and varying vehicles into the surveillance and/or maintenance system. In such a setting, the access module of the vehicle can be accessed (as a source module) by the access module of the infrastructure (as a target module), hence allowing the system to integrate vehicles when they enter the infrastructure and hence their state is relevant to the state of the infrastructure.

In another advantageous embodiment, the system comprises at least one storage module which is configured to store the sensor data of at least one sensor module. In particular, the at least one storage module is configured to store the sensor data of at least two sensor modules or all sensor modules. The at least one access module (or one of the at least on access modules) is configured to access the collected sensor data in the sensor module and/or the stored sensor data in the storage module. Obviously, there may be one access module accessing the sensor data in the sensor module and forwarding it to the storage module (and/or another module such as an output or a further access module), while a second access module accesses the sensor data in the storage module and forwards it to yet another module, such as an analysis module, for instance.

This gives the advantage that the flexibility of the system is further increased, as, for instance in order to reduce data traffic in the network, only part of the sensor data may be forwarded to an output or analysis module, for instance as soon as the data is available in a synchronized way, but the complete sensor data may be stored for later analysis. Also, by storing the sensor data, an off-line functionality may be enabled where the complete sensor data (which may also comprise data not relevant in the daily routing) can be reviewed, for instance after some event occurred, in order to pinpoint cause and/or effect of said event.

Therein, each sensor data stored in the storage module may comprise a plurality of sub-data, where each sub-data has a specific timestamp, and the access unit is configured to, when accessing store sensor data in the storage module, access only sub-data with the timestamp that is specified for the particular accessing or a time stamp within a specified, i.e. preset range that is specified for the particular accessing. This gives the advantage of an accessing functionality inside the storage module, which further reduces traffic load in the network, as only the required data specified in the accessing has to be transmitted, which is minimized in size. Specifying a time range for the time stamp instead of a particular time stamp gives the advantage to search the data within given range (time A to Time B), not every time necessarily with exact match.

In a further advantageous embodiment, the sensor modules and/or the at least one access module and/or other at least one storage module can be configured remotely and/or dynamically during operation of the system as functioning surveillance system. For instance, an access module of a vehicle such as a train, can be, at the time of entering an infrastructure such as a train station, configured to forward sensor data of specific sensor modules of the vehicle to a corresponding access module and/or output module and/or analysis module of the infrastructure when entering the infrastructure. At the time of leaving the infrastructure, the access module of the vehicle may be configured to forward sensor data of a different specific sensor modules to the respective module located in the infrastructure.

This gives the advantage of further flexibility and reduction of the complexity of the system, as the respective modules can be configured to the specific requirements in the situation at hand dynamically, which reduces the administration overhead and unnecessary transmission of data and thereby increases clarity of data output to human supervisor.

In yet another advantageous embodiment, the sensor modules and/or the at least one access module and/or the at least one storage module can be configured to collect, respectively access and forward, and/or store sensor data only in one or more preset time intervals and/or only with a data rate limited by a predetermined or preset maximum data rate. This preset time interval or preset maximum data rate may also be preset dynamically, for instance in dependence upon a network load. In particular, the preset time intervals may be determined by a maximum size of the sensor data corresponding to the preset time intervals, that is determined by the size of the sensor data forwarded for a certain period of time taken into account. For instance, a camera may be configured to transmit only every second collected or recorded image to a corresponding access module.

This gives the advantage that a data load in the network of the system may be reduced, avoiding data congestions and the corresponding undesired effects, while the effective monitoring of infrastructure and vehicle is still possible according to preset criteria. For instance, transmitting only every second image of a camera still allows an effective visual monitoring of an area whereas transmitting the complete set of all images in half of the time may result in a less effective monitoring.

The system may comprise more than one access module and/or more than one storage module, where each access module and/or each storage module may be configured to access and forward and/or store sensor data only of a subset of sensor modules and/or only of a subset of time intervals. So, specific sensor modules may be associated with specific access and/or storage modules.

This gives the advantage of an improved distribution of data traffic in the network, which avoids bottlenecks. Furthermore, a distributed accessing and/or storing of the sensor data may result in improved data security and/or robustness.

In a particularly advantageous embodiment, the at least two sensor modules and the at least one access module is part of a first subsystem, which may also comprise one or more storage modules and/or an output module and/or an analysis module. The surveillance and/or maintenance system then also comprises a second subsystem with at least one other sensor module and at least one other access module configured to access the sensor data of the other sensor module(s), where the access module of the second subsystem is configured to forward the sensor data of the other sensor module(s) to the access module or one of the access modules of the first subsystem. The second subsystem, as the first subsystem, may also comprise one or more other storage modules and more one or more, that is, at least one output module. So, the access module of the first and second subsystem may forward the sensor data of first and second subsystem to the corresponding output modules of the first subsystem. The access module of the second subsystem may forward only the sensor data of the second subsystem to the corresponding output modules of the second subsystem. Therefore, via the output module of the second subsystem, the second subsystem can be monitored, and via the output module of the first subsystem, first and second subsystem can be monitored. Obviously, the number of sensor modules in the different subsystems is not limited to the described examples. What has been described for the sensor modules (and other modules) of the complete surveillance and/or maintenance system can also be realized in the sensor modules (and other modules) of said subsystems.

This gives the advantage that the system may be composed of different, hierarchically arranged subsystems, which increases flexibility and possible applications of the system. So, the system may be extended according to the need at hand, for instance with several different second subsystems associated with the first subsystem.

In particular, first and second subsystem may be installed in different entities and/or at different locations. The first subsystem may be installed in an infrastructure such as a train station and the second subsystem(s) can be installed in a vehicle such as a train. This gives the advantage that both locations, in particular infrastructure and vehicle can be monitored both on their own and jointly.

Another aspect relates to a method for surveilling an infrastructure and/or a vehicle, with a number of method steps. One method step is collecting, by at least two sensor modules, respective sensor data from a respective sensor associated with the respective sensor module. Another method step is accessing, by at least one access module, the sensor data. Further method steps comprise providing, by a clock module, a common time signal to all sensor modules and providing, by the sensor modules the respective sensor data with a timestamp, where the timestamp is based on the common time signal. Finally, another method step is forwarding, by the access module, accessed sensor data taking into account the timestamp, to another module, which may be referred to as target module.

Advantages and advantageous embodiments of the method correspond to advantages and advantageous embodiments of the surveillance and/or maintenance system.

The features and combinations of features described above, as well as the features and combinations of features disclosed in the figure description or the figures alone may not only be used alone or in the described combination, but also with other features or without some of the disclosed features without leaving the scope of the invention. Consequently, embodiments that are not explicitly shown and described by the figures but that can be generated by separately combining the individual features disclosed in the figures are also part of the invention. Therefore, embodiments and combinations of features that do not comprise all features of an originally formulated independent claim are to be regarded as disclosed. Furthermore, embodiments and combinations of features that differ from or extend beyond the combinations of features described by the dependencies of the claims are to be regarded as disclosed.

Exemplary embodiments are further described in the following by means of schematic drawings. Therein, FIG. 1 shows a first exemplary embodiment of a surveillance system;

In the figures, identical or functionally identical elements have the same reference signs.

Figure 1:
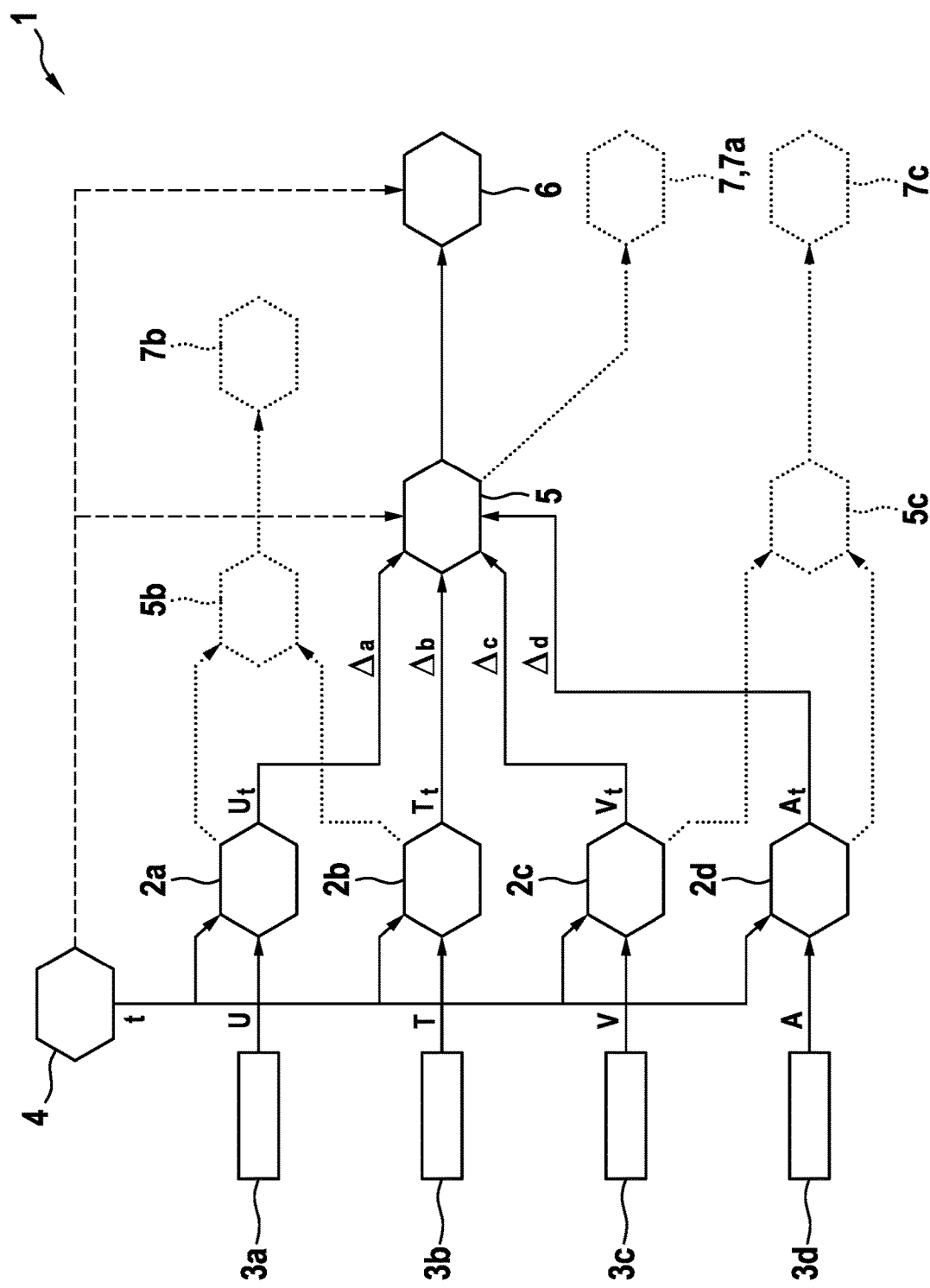

FIG. 1 shows a first exemplary embodiment of a surveillance system 1 for an infrastructure and/or for a vehicle. The surveillance system 1 comprises at least two, this example four sensor modules 2a-2d which are configured to collect respective sensor data U, T, V, A from respective associated sensors 3a-3d. In the present embodiment, the first sensor 3a is a voltage sensor which provides respective voltage data U as sensor data. The second sensor 3b may be a temperature sensor which provides respective temperature data T as sensor data. In the present example, the third sensor 3c is chosen to be a camera sensor which provides respective video data V as sensor data, and the fourth sensor 3D as a microphone sensor that provides audio data A as sensor data. Any other sensor may be used instead or in addition to the shown examples.

The surveillance system 1 also comprises a clock module 4, which can also be referred to as master clock module, which is configured to provide a common time signal t to all sensor modules 2a-2d. The clock module 4 may also, as indicated by the dashed arrows, provide the time signal t to other modules, such as an access module 5 and/or an output module 6, which are also part of the surveillance system 1 in the present example, and/or a storage module (not shown).

The sensor modules 2a-2d are configured to provide the sensor data U, T, V, A with a timestamp, where the timestamp is based on the common time signal t. So, the sensor modules 2a-2d make available the sampled, and normally digitalized, physical value corresponding to the respective sensor 3a-3d to the requesting module, the access module 5. The sensor data attached with the timestamp may be referred to as sensor data $U_t, T_t, V_t, A_t$, where the index is omitted in the following. The timestamp may be attached to every sampled value, or intermittently. For instance, one timestamp may be provided for every 10 samples of the sensor data U, T, V, A when the sample frequency is constant.

The at least one access module 5 is configured to access the sensor data U, T, V, A and forward the accessed sensor data U, T, V, A taking into account the timestamp t. So, the access module is configured to receive the necessary data from the corresponding sensor modules, in the present example the sensor modules 2a-2d. Therein, each inbound sensor data U, T, V, A has a respective lag or delay Δa-Δd which depends on the route the data takes in the network of the system 1.

Correspondingly, the present example, the access module 5 also has a synchronization function, where the sensor data U, T, V, A from time t is buffered, that is, temporarily stored for a short time, in the access module 5 and then sent to another module, here the output module 6, with a unified latency or delay, for instance at a time t+x, where x is the unified rendering latency. The unified latency x may be the maximum delay of the individual delays Δa-Δd or any latency longer than said maximum.

However, the access module 5 may be configured to wait for the sensor data U, T, V, A only for a specific maximum waiting time, which is smaller than the maximum of the individual delays Δa-Δd. This effectively realizes a deadline up to which it is maximally waited for delayed data. Such a deadline, a specific maximum waiting time, can be programmed for each sensor module or group of sensor modules. For instance, such a maximum waiting time or deadline time can be chosen relatively small for sensors which provide a numerical value such as voltage or temperature or audio sensor, for instance, and relatively large for camera images. To this end, it may be advantageous if the time signal t of the clock module 4 is provided to the access module 5 so that the amount of delay can be quantified precisely.

Alternatively, the access module may be configured to forward the sensor data U, T, V, A to other modules without the synchronization function, that is, as soon as the respective sensor data U, T, V, A is available in the access module 5. The output module 6, to which the sensor data U, T, V, A is forwarded in the present example, may be attached to or comprise a respective monitor and/or loudspeaker in order to output the synchronized or non-synchronized sensor data U, T, V, A to a user.

In addition or alternatively, the access module 5 may forward the sensor data U, T, V, A to one or more additional modules, in the present example an analysis module 7, 7a which is configured to analyze the sensor data U, T, V, A (indicated by the dotted arrow). The analysis module 7 may be a general analysis module 7 for detecting or analyzing a large variety of events, or a specific analysis module 7a, 7b, 7c, which is configured to detect or analyze specific events such as a fire, a vehicle malfunction, or an abnormality in passenger behavior. In the present example, the specific analysis module 7b for detecting a vehicle malfunction requires only sensor data U, T from two sensor modules 2a, 2b and therefore, for reasons of efficiency, receives the sensor data U, T from another access module 5b (indicated by dotted arrows). Correspondingly, in the present example, the specific analysis module 7c for instance for detecting an abnormality in passenger behavior relies on sensor data V, A from other sensor modules 2c, 2d which is forwarded to analysis module 7c by yet another access module 5c in the present example (indicated by dotted arrows).

Obviously, the specific analysis modules 7b, 7c could also be provided with the respective sensor data U, T, V, A by access module 5. In order to provide the analysis and/or storage and/or output modules with corresponding access modules, a respective access module may be integrated into the module it is configured to forward sensor data to. This applies both to hardware and/or software units being or comprising the respective modules.

Figure 2:
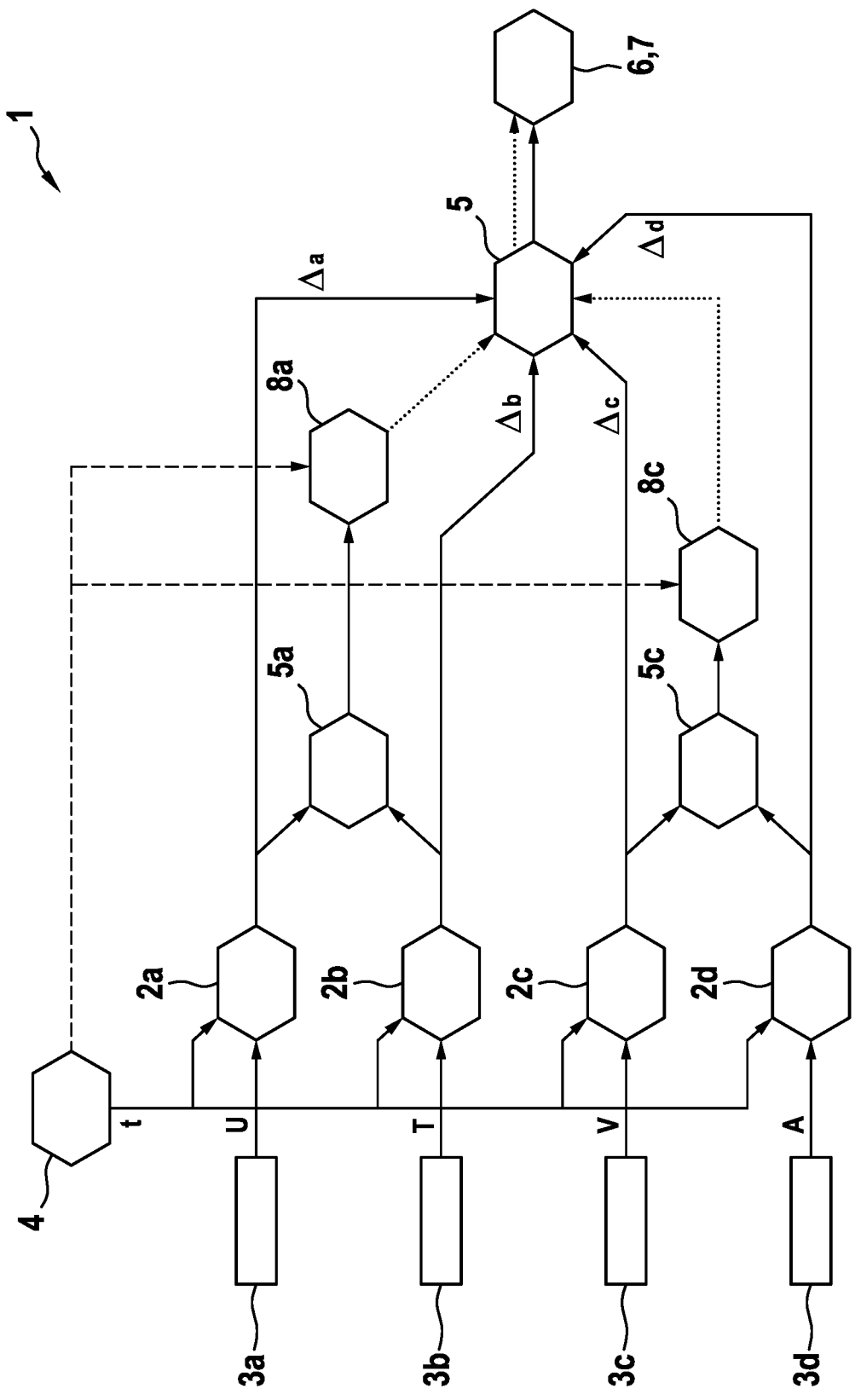
FIG. 2 shows a second exemplary embodiment of a surveillance system.

In FIG. 2, another exemplary embodiment of a surveillance system 1 is shown. Here, the sensor data U, T of some sensor modules 2a, 2b are provided to a first storage module 8a by corresponding access module 5a and the sensor data V, A of other sensor modules 2c, 2d are provided to second storage module 8c by another corresponding access module 5C in the standard "online" surveillance mode, which is also shown in FIG. 1.

In this online surveillance mode, the respective vehicle and/or infrastructure is monitored by use of the surveillance system 1 in real-time or near real-time in order to be, for instance, able to ensure the proper function of vehicle and/or infrastructure and be capable to respond timely to an undesired event such as an accident or a fire. However, it may be desired to, for instance after said undesired event has happened, understand the underlying causal chain, and therefore access the sensor data U, T, V, A hours or even days after they have been recorded. To this end, they are, in the example at hand, stored in the respective storage modules 8a, 8c. Alternatively to the shown decentralized storage, access module 5 could also forward the sensor data U, T, V, A to a central storage module (not shown).

The clock module 4 may provide the common time signal t to the storage modules 8a, 8c in order to synchronize the sensor data U, T, V, A, but is not required. In case the data synchronized, be it by the respective access module 5a, 5c or the storage module 8a, 8c itself, the timestamp can, for instance, be used as an index of tabulated data, which allows more efficient data retrieval.

When the stored data U, T, V, A is to be retrieved for post event analysis, the surveillance system 1 may be operated in a so-called "offline" surveillance mode, where the sensor data U, T, V, A stored in the storage modules 8a, 8c is accessed by the access module 5 and forwarded to module that may be the output module 6 for manual surveillance and/or the analysis module 7 for automatic surveillance. This access of the storage modules 8a, 8c, the offline mode, is symbolized in FIG. 2 by the dotted arrows.

Figure 3:
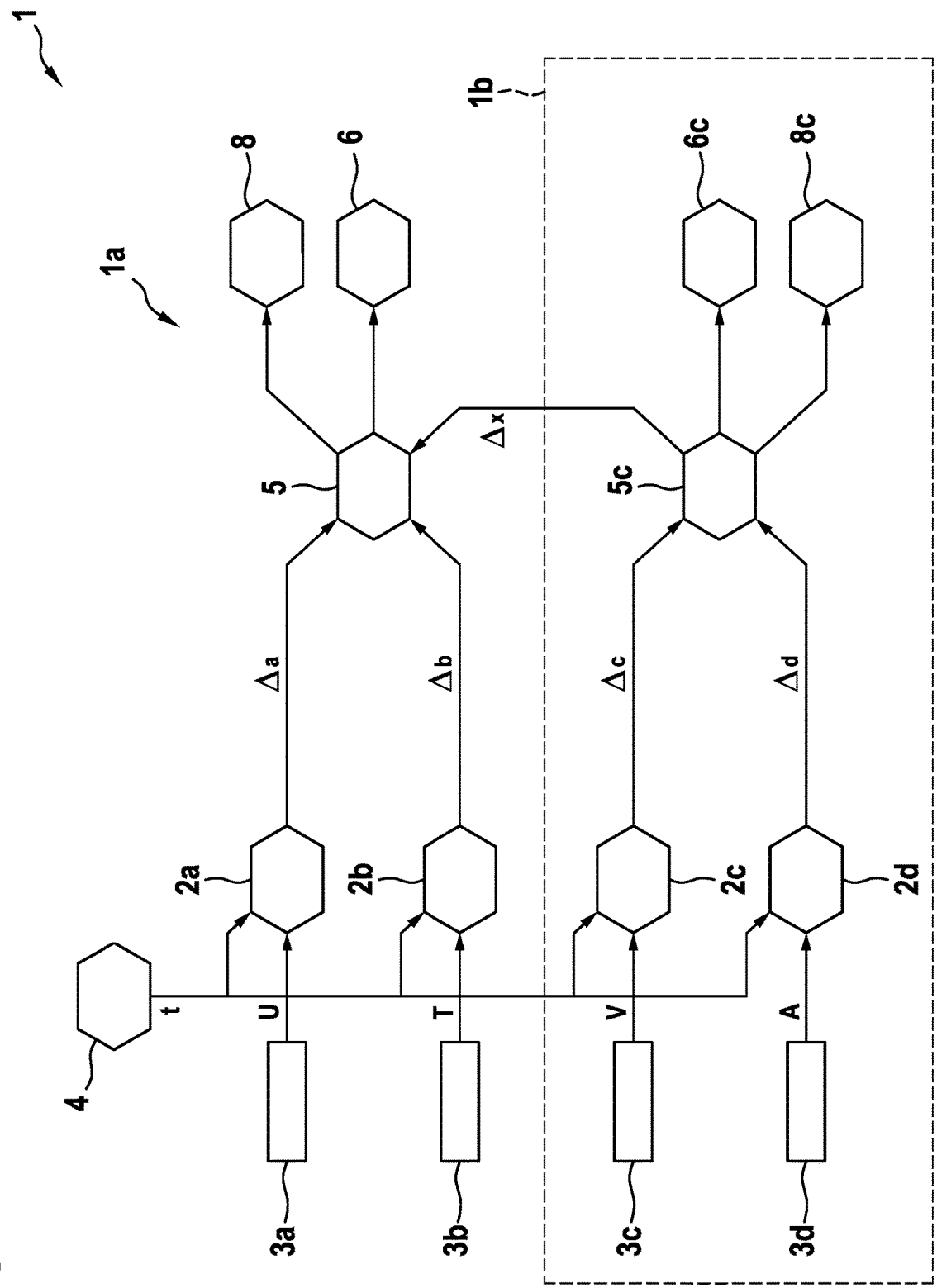
FIG. 3 shows a third exemplary embodiment of a surveillance system.

FIG. 3 shows yet another exemplary embodiment of the surveillance system 1. Therein, some sensor modules 2a, 2b and access module 5 are part of a first subsystem 1a, and one or more other sensor modules 2c, 2d as well as a corresponding other access module 5c are part of a second subsystem 1b.

Here, the access module 5 of the first subsystem 1a is configured to access sensor data U, T of the sensor modules 2a, 2b of the first subsystem 1a and configured to access sensor data V, A of the sensor modules 2c, 2d of the second subsystem 1b, the latter via the other access module 5c. Access module 5 is also configured to, in the present example, forward the accessed sensor data U, T, V, A to the output module 6 and to a storage modules 8. In addition, or alternatively, the access module 5 of the first subsystem 1a can also be configured to forward the accessed sensor data U, T, V, A to another module such as a an analysis module.

The access module 5c of the second subsystem 1b is configured to access sensor data V, A of the sensor modules 2c, 2d of the second subsystem 1b and to forward it to the access module 5 of the first subsystem 1a. Furthermore, in the present example, access module 5c is configured to forward the sensor data A, V to a corresponding (local) output unit 6c of the second subsystem 1b, as well as to a (local) storage module 8c. When forwarding said sensor data A, V to the access module 5 of the first subsystem 1a, a corresponding delay Δx might arise, which then can be dealt with by the access module 5 similar to what has been described above for the delays Δa-Δd.

First and second subsystem 1a, 1b may be installed in different entities, for example the first subsystem 1a might be installed in an infrastructure and the second subsystem 1b might be installed in a vehicle, with local output module 6c and local storage module 8c installed in the vehicle. Then, throughout the operation of the vehicle, a user can monitor the state of said vehicle by use of the output module 6c. The sensor data of the corresponding sensor modules 2c, 2d can be stored in said storage module 8c for later retrieval, in particular for making available the history of the vehicle's sensor data available to the access module 5 of the infrastructure and hence a user of the surveillance system 1a of the infrastructure. As the vehicle might move, said delay Δx can also change dynamically, which can either be compensated, in particular up to a given maximal latency x, or not be compensated, where, when output to a user, the delayed data can be marked accordingly. In addition and/or alternatively, as the available network bandwidth between a vehicle and an infrastructure is often limited, the access module 5c of the second subsystem 1b may also forward only sensor data of a subset of the sensor modules 2c, 2d of the second subsystem 1b to access module 5, in particular in dependence upon the bandwidth available.

So, in the infrastructure, not only the state of the infrastructure represented by the sensor data U, T of the sensor modules 2a, 2b of the first subsystem 1a can be monitored via output module 6: As the access module 5C of the second subsystem 1b can be accessed by the access module 5 of the first subsystem 1a, also the state of said vehicle can be monitored (provided a data connection exists between the two access modules 5, 5c). To this end, access module 5c and/or access module 5 as well as the other modules of the system 1 may be configured remotely, so as to allow, for instance, the establishment of a data connection between said access modules 5, 5c. Such a data connection may be automatically established if given conditions are met, for instance when the vehicle with the subsystem 1b approaches the infrastructure with the subsystem 1a to a given distance. So, already the state of a train approaching a train station can be monitored by the surveillance system 1a of the train station.

Figure 4:
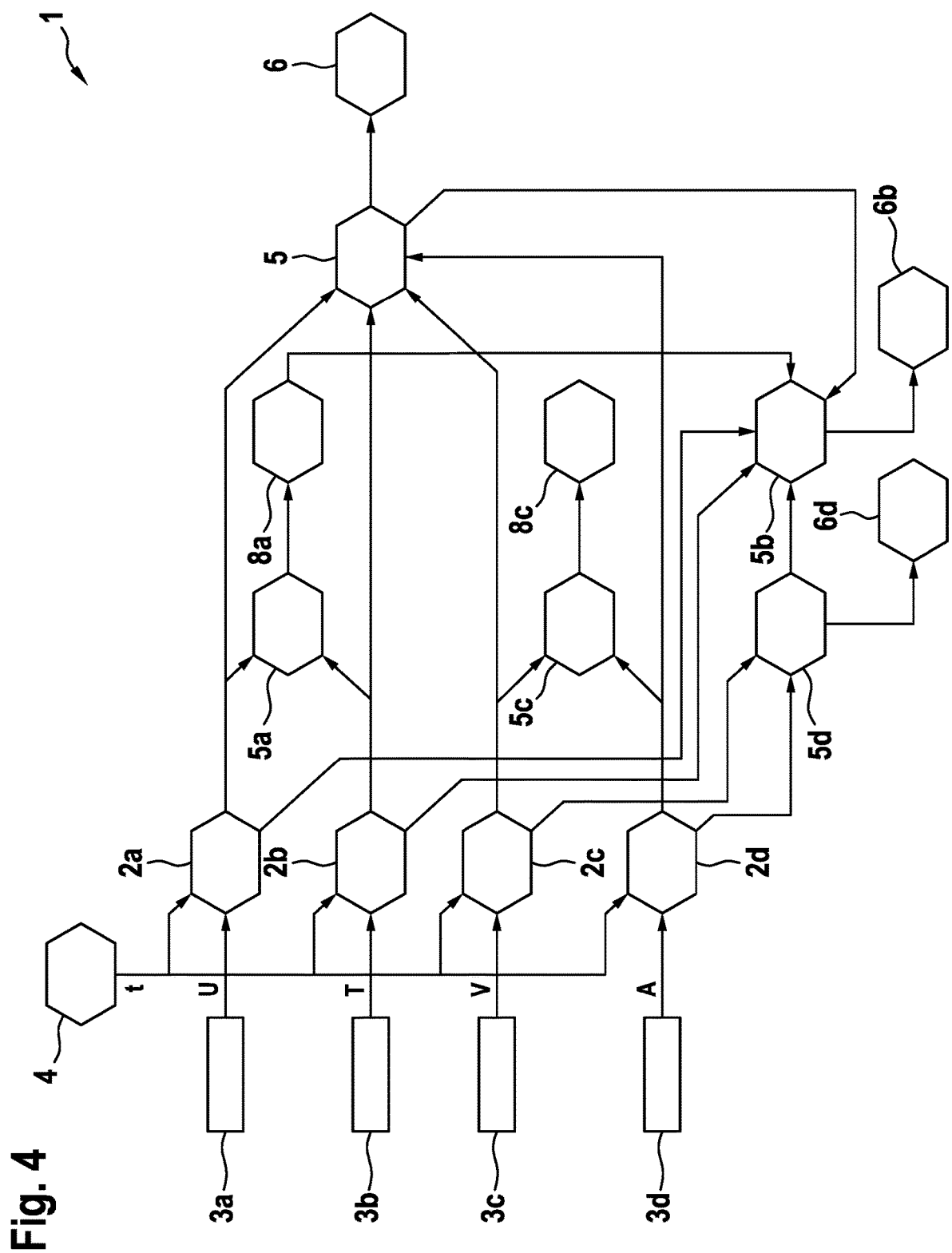
FIG. 4 shows a fourth exemplary embodiment of a surveillance system.

FIG. 4 shows another exemplary embodiment of the surveillance system 1. In addition to the modules and corresponding connections shown in FIG. 2, the present embodiment also comprises further access modules 5b, 5d and further output modules 6b, 6d, which are connected to the modules known from FIG. 2 via additional data connections.

In addition to access module 5, the sensor data V, A of some sensor modules 2c, 2d is accessed by one further access module 5d, which forwards the corresponding data to the further output module 6d and to the second further access module 5b. Said second further access module 5d accesses the sensor data U, T of some other sensor modules, here the remaining sensor modules 2a, 2b, and forwards it to the second further output module 6b. In the present example, the second further access module 5b accesses said sensor data U, T (directly) via the sensor modules 2a, 2b and, in addition, (indirectly) via the storage module 8a and the access module 5.

Therein, the sensor modules 2a-2d as well, the present example, the other modules 5, 5a-5d, 6, 6b, 6d, 8a, 8c have a unified interface so that also different kind of sensor data U, T, V, A can be handled by different modules with common design. This enables simplified measuring the load of the system, and distributing the processing in the system, i.e. accessing, forwarding, storing, outputting and the like, dynamically taking into account the load of the system. For instance, a task for an overloaded module or overloaded hardware component may be shared with or divided to another module by cascading the modules correspondingly, an example for which is shown in FIG. 4. Also, the data flow through the system can be adapted by changing the data flow route. This flexible setup also allows specific sensor data, that is, specific types of sensor data and/or sensor data of specific sensor modules, to be prioritized and, for instance forwarded to a corresponding output module while other, non-prioritized sensor data is not forwarded but, for instance, only output locally or only stored for later access.

The invention claimed is:

1. Surveillance system for an infrastructure and/or for a vehicle, comprising:
   at least two sensor modules configured to collect respective sensor data from respectively associated sensors;
   at least one access module configured to access the sensor data; and
   a clock module being configured to provide a common time signal at least to two of the sensor modules, wherein
   the sensor modules are configured to provide the sensor data with a time stamp, wherein the time stamp is based on the common time signal,
   the at least one access module being configured to forward the accessed sensor data by taking into account the time stamp,
   the sensor modules and/or the at least one access module have a common design so that different kinds of sensor data can be handled by different modules using the common design enabling simplified measuring of a network load of the system,
   the sensor modules and/or the at least one access module can be configured during operation of the system to collect and/or access and forward sensor data only with a data rate limited by a predetermined maximum data rate which is preset dynamically in dependence upon the network load of the system,
   the at least one access module is configured to forward the sensor data of at least two different source modules to at least one output module and/or at least one storage module and/or another access module and/or the analysis module in a synchronized way, where in particular the source modules may be are the sensor modules or the at least one storage module or at least one output module or mixtures of said modules,
   the at least one access module is configured to, in order to forward the sensor data of the at least two different source modules in a synchronized way, evaluate respective time lag of the sensor data stemming from the different source modules, and delay forwarding sensor data of at least one source module based on a maximum time lag evaluated, and
   a subset of the sensor data is forwarded in an unsynchronized way, wherein the subset arrives in the at least one access module, and when unsynchronized sensor data is output, the unsynchronized sensor data is marked as unsynchronized.

2. The surveillance system according to claim 1, wherein the at least one access module is configured to forward the sensor data to an output module, in particular the output module with a monitor and/or a loudspeaker, and/or to another access module and/or to an analysis module, which is configured to analyze the sensor data.

3. The surveillance system according to claim 1, wherein the sensor modules are of at least two different types, where each type of sensor module is associated with a different type of sensor and is configured to collect a different type of sensor data.

4. The surveillance system according to claim 3, wherein each of the different types of sensor modules is associated with at least one of the following sensors as respective sensor: camera sensor, multi-camera sensor, microphone sensor, multi microphone sensor, temperature sensor, fire alarm sensor, smoke sensor, voltage sensor, power consumption sensor, door sensor, emergency button sensor, escalator load sensor, vehicle load sensor, electronic current sensor, flow rate sensor, pressure sensor, rotational and/or translational speed sensor, rotational and/or translational acceleration sensor, vibration sensor, motion detection sensor, radar sensor, Hall sensor, ultrasonic sensor, GPS sensor, load cell sensor, light barrier sensor.

5. The surveillance system according to claim 1, wherein the sensor modules and/or the at least one access module have unified interfaces and/or are configured to be exchangeable, in particular during the operation of the system.

6. The surveillance system according to claim 1, wherein at least one storage module is configured to store the sensor data of at least one sensor module, where the at least one access module is configured to access the sensor data in the at least one sensor module and/or the sensor data in the at least one storage module.

7. The surveillance system according to claim 6, wherein each sensor data stored in the at least one storage module comprises a plurality of sub-data, each sub-data with a specific time stamp, and the access module is configured to, when accessing sensor data in the at least one storage module, access only sub-data with a time stamp specified or a time stamp within specified range for the particular accessing.

8. The surveillance system according to claim 1, wherein the sensor modules and/or the at least one access module and/or at least one storage module is capable of being configured remotely and/or during operation of the system.

9. The surveillance system according to claim 8, wherein the sensor modules and/or the at least one access module and/or the at least one storage module can be configured to collect and/or access and forward and/or store sensor data only in one or more preset time intervals and/or only with a data rate limited by a predetermined maximum data rate.

10. The surveillance system according to claim 8, wherein the at least one access module and/or the at least one storage module, where each access module and/or each storage module is configured to access and forward and/or store sensor data only of a subset of sensor modules and/or only of a subset of time intervals.

11. The surveillance system according to claim 1, wherein the at least two sensor modules and the at least one access module being part of a first subsystem, and by a second subsystem with at least one other sensor module and at least one other access module configured to access the sensor data of the other sensor module, where the access module of the second subsystem forwards the sensor data of the other sensor module to the access module of the first subsystem.

12. The surveillance system according to claim 11, wherein first and second subsystem are installed in different entities, in particular with the first subsystem being installed in an infrastructure and the second subsystem being installed in a vehicle.

13. A method for surveilling an infrastructure and/or a vehicle using a surveillance system with at least two sensor modules of the modular surveillance system and one access module of modular surveillance system having a common design so that different kinds of sensor data can be handled by different modules using the common design enabling simplified measuring of a network load of the system, the method comprising steps of:
 collecting, by at least two sensor modules, respective sensor data from a respective sensor associated with the respective sensor module;
 accessing, by at least one access module, the sensor data;
 providing, by a clock module, a common time signal to at least two sensor modules;
 providing, by the sensor modules, the sensor data with a time stamp, wherein the time stamp is based on the common time signal;
 forwarding, by the access module, the accessed sensor data by taking into account the time stamp,
 configuring the at least one access module to forward the sensor data of at least two different source modules to at least one output module and/or at least one storage module and/or another access module and/or the analysis module in a synchronized way, wherein the source modules are the sensor modules or the at least one storage module or at least one output module or mixtures of said modules,
 configuring the at least one access module, in order to forward the sensor data of the at least two different source modules in a synchronized way, evaluate respective time lag of the sensor data stemming from the different source modules, and delay forwarding sensor data of at least one source module based on on a maximum time lag evaluated, and
 a subset of the sensor data is forwarded in an unsynchronized way, wherein the subset arrives in the at least one access module, and when unsynchronized sensor data is output, the unsynchronized sensor data is marked as unsynchronized.

* * * * *